(12) United States Patent
Lee et al.

(10) Patent No.: US 8,976,170 B2
(45) Date of Patent: Mar. 10, 2015

(54) APPARATUS AND METHOD FOR DISPLAYING STEREOSCOPIC IMAGE

(75) Inventors: Gun A. Lee, Daejeon (NZ); Ung-Yeon Yang, Daejeon (KR); Yong-Wan Kim, Daejeon (KR); Dong-Sik Jo, Daejeon (KR); Ki-Hong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 356 days.

(21) Appl. No.: 13/474,535

(22) Filed: May 17, 2012

(65) Prior Publication Data

US 2013/0044103 A1 Feb. 21, 2013

(30) Foreign Application Priority Data

Aug. 17, 2011 (KR) .................. 10-2011-0081728

(51) Int. Cl.
*G06T 15/00* (2011.01)
*H04N 13/04* (2006.01)

(52) U.S. Cl.
CPC ....... *H04N 13/0443* (2013.01); *H04N 13/0484* (2013.01)
USPC .............. 345/419; 345/7; 345/428; 348/169; 382/103

(58) Field of Classification Search
CPC .................. H04N 13/0484; H04N 13/0443
USPC ............... 345/419, 428, 7; 348/169; 382/103
See application file for complete search history.

(56) References Cited

U.S. PATENT DOCUMENTS

| 7,460,150 B1* | 12/2008 | Coughlan et al. | ............. 348/169 |
|---|---|---|---|
| 7,783,077 B2* | 8/2010 | Miklos et al. | ................. 382/103 |
| 8,717,363 B2* | 5/2014 | Contractor et al. | ........... 345/428 |
| 2004/0135744 A1 | 7/2004 | Bimber et al. | |
| 2008/0144175 A1 | 6/2008 | Simonsen | |

FOREIGN PATENT DOCUMENTS

| WO | WO 02/15110 A1 | 2/2002 |
|---|---|---|
| WO | WO 2006/079341 A1 | 8/2006 |

OTHER PUBLICATIONS

Oliver Bimber et al., "The Virtual Showcase", 2001, IEEE Computer Graphics and Applications.

* cited by examiner

*Primary Examiner* — Phu K Nguyen

(57) ABSTRACT

Disclosed is an apparatus for displaying stereoscopic images. The apparatus for displaying stereoscopic images includes a stereoscopic image-generating part, a main display part, a sub-display part, and a translucent reflective structure part. The stereoscopic image-generating part splits a single image to generate a first stereoscopic image to be directly viewed by a user and a second stereoscopic image to be reflected and viewed by the user. The main display part directly displays the first stereoscopic image to a gaze of a user. The sub-display part displays the second stereoscopic image. The translucent reflective structure part reflects the second stereoscopic image displayed on the sub-display part.

20 Claims, 15 Drawing Sheets

APPARATUS AND METHOD FOR DISPLAYING STEREOSCOPIC IMAGE

CROSS-REFERENCE TO RELATED APPLICATION

This application claims the benefit of Korean Patent Application No. 10-2011-0081728, filed on Aug. 17, 2011, which is hereby incorporated by reference in its entirety into this application.

BACKGROUND OF THE INVENTION

1. Technical Field

The present invention relates to an apparatus and a method for displaying stereoscopic images, and more particularly, to an apparatus and a method for displaying stereoscopic images capable of providing stereoscopic images having a more realistic three-dimensional effect and spatial sensation to users.

2. Description of Related Art

Generally, a three-dimensional image display is a technology for adding depth information to two-dimensional images and using the depth information to enable an observer to feel three-dimensional liveliness and reality.

Typical apparatuses for displaying stereoscopic images according to these technologies have been implemented using various forms and schemes so far. To date, most such technologies use the principle of binocular disparity to display stereoscopic images. Images projected to the left eye and the right eye are slightly different from each other. As such, when the binocular disparity is perceived, a three-dimensional effect is generated, thereby obtaining a projection effect.

Representative methods for displaying three-dimensional images are largely classified into a stereoscopic scheme and an auto-stereoscopic scheme, as schemes for splitting left and right images according to the related art. Examples of the stereoscopic scheme include an anaglyph scheme, a polarizing eyeglass scheme, a liquid crystal shutter scheme, and the like, and examples of the auto-stereoscopic scheme include a lenticular sheet scheme, a parallax barrier scheme, an optical plate scheme, and the like.

Further, as the auto-stereoscopic scheme, there is a method of generating images only on the surface of a stereoscopic image table using only one stereoscopic image display, and generating stereoscopic images on a space using a reflecting mirror. These related arts enable virtual contents to be observed only in a limited direction.

SUMMARY OF THE INVENTION

An embodiment of the present invention is directed to stereoscopic images having a more realistic three-dimensional effect and spatial perception to users by providing the stereoscopic images on a table surface, that is, the surface of a main display part, and even to the top of the table using a translucent reflective structure part.

Another embodiment of the present invention is directed to realizing accurate stereoscopic images that match the gaze of users by tracking and analyzing the gaze of the users.

Still another object of the present invention is to provide stereoscopic images to users by appropriately matching various points of view of users by disposing a main display part, a sub-display part, and a translucent reflective structure part of an apparatus for displaying stereoscopic images in various structures.

According to an embodiment of the present invention, there is provided an apparatus for displaying stereoscopic images, including: a stereoscopic image-generating part that splits a image to generate a first stereoscopic image to be directly viewed to a user and a second stereoscopic image to be viewed to the user due to reflection; a main display part that directly views the first stereoscopic image to a gaze of a user; a sub-display part that displays the second stereoscopic image; and a translucent reflective structure part that reflects the second stereoscopic image displayed on the sub-display part and displays the reflected second stereoscopic image to the gaze of the user.

The apparatus for displaying stereoscopic images may further include: a user tracking part that tracks the user's gaze information, wherein the stereoscopic image-generating part reflects the gaze information of the user to spilt and generate the first stereoscopic image and the second stereoscopic image.

According to another embodiment of the present invention, there is provided a method for displaying stereoscopic images, including: generating a first stereoscopic image to be directly viewed to a user and a second stereoscopic image to be displayed to the user due to reflection by splitting a single image; and directly displaying the first stereoscopic image to a gaze of a user and reflecting and viewing the second stereoscopic image to the gaze of the user through a translucent reflective structure.

The method for displaying stereoscopic images may further include: tracking gaze information of the user; and analyzing the gaze information of the user, wherein the generation of the stereoscopic image splits and generates the first stereoscopic image and the second stereoscopic image based on the gaze information analyzed during the analysis of the gaze information.

According to another embodiment of the present invention, there is provided an apparatus for displaying stereoscopic images, including: a stereoscopic image-generating part that generates at least one first stereoscopic image using information on different points of view of each of the plurality of users and generates at least one second stereoscopic image corresponding to the at least one first stereoscopic image and using information regarding different points of view and motions of bodies of the plurality of users; a main display part that directly views the at least one first stereoscopic image to gazes of each of the plurality of users using the information regarding the different points of view and the motions of bodies of each of the plurality of users; a sub-display part that displays the at least one second stereoscopic image; and a translucent reflective structure part that reflects the at least one second stereoscopic image displayed on the sub-display part and displays the reflected second stereoscopic image to the gazes of each of the plurality of users, wherein the stereoscopic image formed on a space by the at least one first stereoscopic image and second stereoscopic image is shown in the same shape at different points of view, and the stereoscopic image-generating part includes a user tracking part that tracks gaze information of each of the plurality of users.

According to another embodiment of the present invention, there is provided a method for displaying stereoscopic images, including: generating at least one first stereoscopic image using information on different points of view of each of the plurality of users and generating at least one second stereoscopic image corresponding to the at least one first stereoscopic image and using information regarding different points of view and motions of bodies of the plurality of users by a stereoscopic image-generating part; directly viewing the at least one first stereoscopic image to gazes of each of the plurality of users using the information regarding the different points of view and the motions of bodies of each of the plurality of users by a main display part; displaying the at least one second stereoscopic image by a sub-display part; and reflecting the at least one second stereoscopic image displayed on the sub-display part and displaying the reflected second stereoscopic image to the gazes of each of the plurality of users by a translucent reflective structure part, wherein the stereoscopic image formed on a space by the at least one first stereoscopic image and second stereoscopic image is shown in the same shape at different points of view, and the tracking of the gaze information of each of the plurality of users includes: tracking the gaze information of each of the plurality of users; and analyzing the gaze information of each of the plurality of users.

DESCRIPTION OF THE PREFERRED EMBODIMENTS

Figure 1:
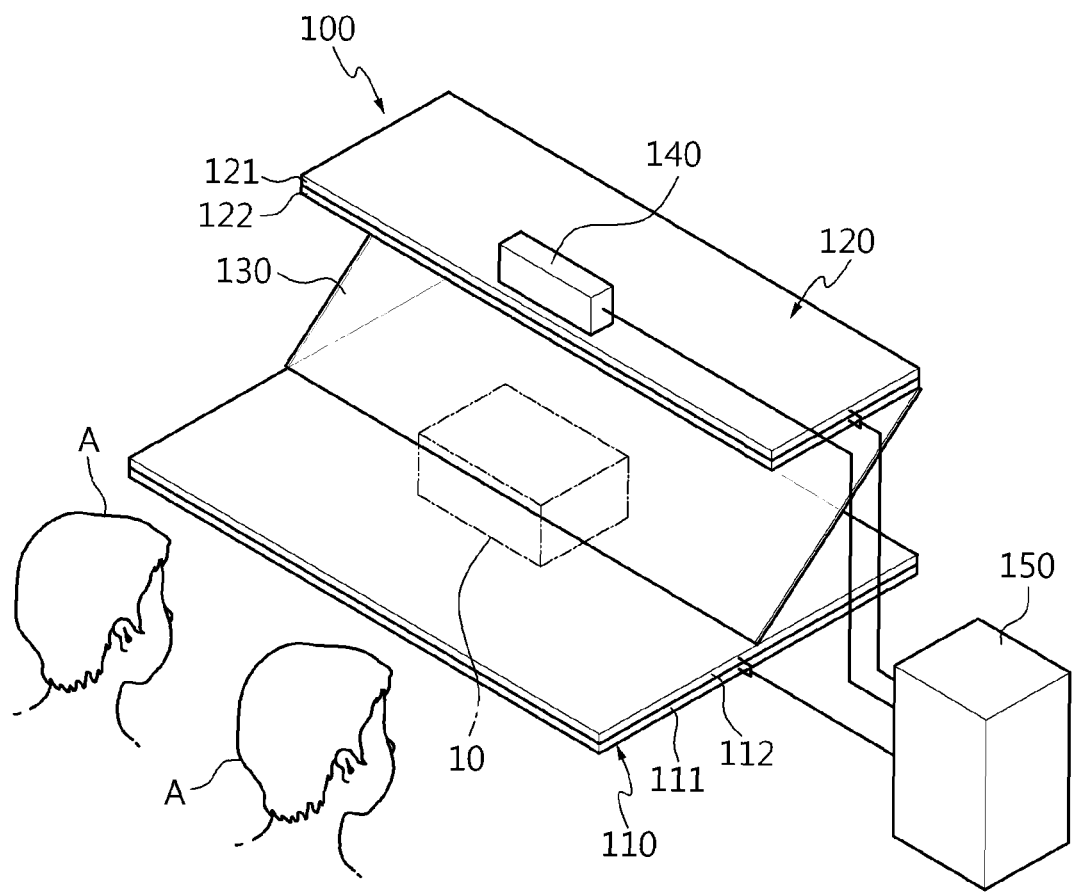
FIG. 1 is a diagram for describing a configuration and an operation of an apparatus for displaying stereoscopic images in accordance with an exemplary embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a diagram for describing the configuration and operation of the apparatus for displaying stereoscopic images in accordance with an exemplary embodiment of the present invention.

Referring to FIG. 1, an apparatus 100 for displaying stereoscopic images in accordance with an exemplary embodiment of the present invention may be configured to include a main display part 110, a sub-display part 120, a translucent reflective structure part 130, and a stereoscopic image-generating part 150. Further, the apparatus 100 for displaying stereoscopic images in accordance with the exemplary embodiment of the present invention may be configured to further include a user tracking part 140.

The main display part 110 directly views a three-dimensional first stereoscopic image to a user A's gaze. That is, one surface of the main display part 110 is disposed at a position that can look down from the user A. The first stereoscopic image will be described below, along with the stereoscopic image-generating part 150.

The main display part 110 may be configured to include a first image output part 111 and a first gaze-splitting device part 112. The first image output part 111 displays a two-dimensional first image for the first stereoscopic image. The first gaze-splitting device part 112 is disposed at one surface of the first image output part 111, that is, at the position to which the user A's gaze is directed.

Further, the first gaze-splitting device part 112 forms the first gaze-blocking pattern, so that the two-dimensional first image of the first image output part 111 is seen to a user as the three-dimensional first stereoscopic image. In this case, the first gaze-blocking pattern may be formed by a parallax barrier scheme.

The sub-display part 120 may be disposed over and parallel to the main display part 110. The sub-display part 120 displays the second stereoscopic image.

The second stereoscopic image will be described below, along with the stereoscopic image-generating part 150. The sub-display part 120 may be configured to include a second image output part 121 and a second gaze-splitting device part 122. The second image output part 121 displays the two-dimensional second image for the second stereoscopic image. The second gaze-splitting device part 122 is disposed on one surface of the second image output part 121, that is, a surface facing the translucent reflective structure part 130. Further, the second gaze-splitting device part 122 forms the second gaze-blocking pattern so that the two-dimensional second image of the second image output part 121 is seen to the user A as the three-dimensional second stereoscopic image through the translucent reflective structure part 130.

In this case, the second gaze-blocking pattern may be formed by the parallax barrier scheme.

The translucent reflective structure part 130 may be obliquely formed between the main display part 110 and the sub-display part 120. Further, one surface of the translucent reflective structure part 130 is disposed at a position to which the user A's gaze is directed. The translucent reflective structure part 130 reflects the second stereoscopic image, displayed on the sub-display part 120, to the gaze of the user A.

The user tracking part 140 tracks the user A's gaze information. That is, the user tracking part 140 tracks information such as the distance from the user A's main display part 110 and the translucent reflective structure part 130, the positions of user A's left and right eyes, and the like. In this case, the user tracking part 140 may track the gaze information of each of the plurality of users A when a plurality of users A is present.

The stereoscopic image-generating part 150 splits and generates a image into the first stereoscopic image, which is directly viewed by the user, and the second stereoscopic image, which is reflected and thus viewed by the user. In this case, the first stereoscopic image and the second stereoscopic image are split and generated so as to be recognized by the user as a single stereoscopic image through the main display part 110 and the translucent reflective structure part 130.

Figure 2:
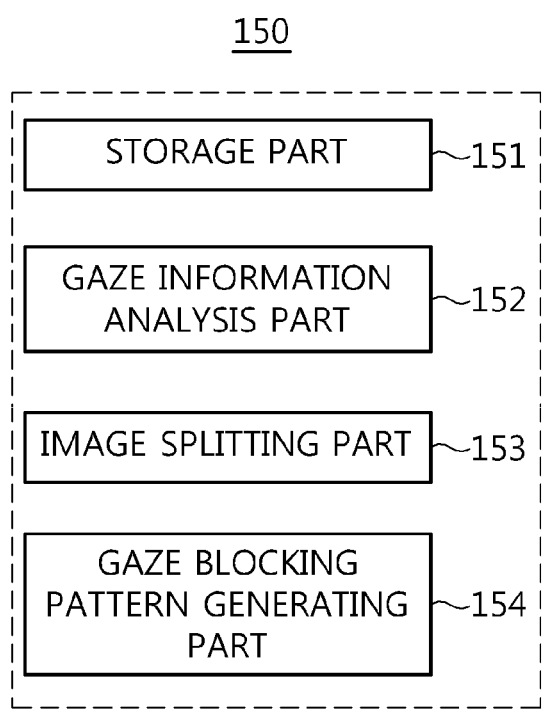
FIG. 2 is a block diagram for describing a configuration of a stereoscopic image-generating part of the apparatus for displaying stereoscopic images in accordance with the exemplary embodiment of the present invention.

Referring to FIG. 2, the stereoscopic image-generating part 150 may be configured to include a storage part 151, a gaze information analysis part 152, an image-splitting part 153, and a gaze-blocking pattern-generating part 154.

FIG. 2 is a block diagram for describing the configuration of a stereoscopic image-generating part of the apparatus for displaying stereoscopic images in accordance with the exemplary embodiment of the present invention.

The storage part 151 stores the image to be provided to the user. In this case, the image may be a two-dimensional image. The gaze information analysis part 152 analyzes the gaze information of the user, acquired by the user tracking part 140. The image-splitting part 153 splits the image into a first image, which is directly viewed by the user, and a second image which is reflected from the translucent reflective structure part 130 so as to be viewed by the user, based on the gaze information analyzed by the gaze information analysis part 152. In this case, the image-splitting part 153 may split the image into the first image and the second image by reflecting the gaze information about each of the plurality of users A when a plurality of users A is present. The gaze-blocking pattern-generating part 154 performs control to form the first gaze-blocking pattern of the first gaze-splitting device part 112 of the main display part 110 and the second gaze-blocking pattern of the second gaze-splitting device part 122 of the sub-display part 120, based on the gaze information analyzed by the gaze information analysis part 152. In this case, the gaze-blocking pattern-generating part 154 may form the first gaze-blocking pattern and the second gaze-blocking pattern by reflecting the gaze information of each of the plurality of users A when a plurality of users A is present.

Figure 3:
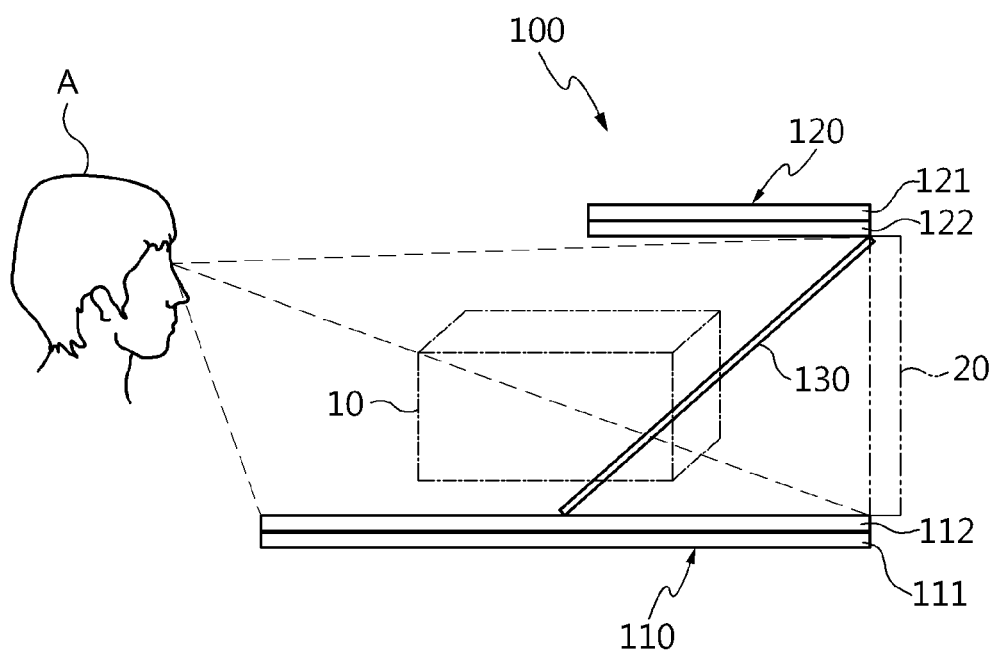
FIG. 3 is a diagram for describing viewing of the stereoscopic images using a main display part, a sub-display part, and a translucent reflective structure part of the apparatus for displaying stereoscopic images in accordance with the exemplary embodiment of the present invention.

FIG. 3 is a diagram for describing viewing of the stereoscopic images using a main display part, a sub-display part, and a translucent reflective structure part of the apparatus for displaying stereoscopic images in accordance with the exemplary embodiment of the present invention.

Referring to FIG. 3, the user recognizes that the single fused three-dimensional image 10 is displayed on a virtual surface 20 due to the translucent reflective structure part 130 and the main display part 110 by operating the three-dimensional image-generating part 150 as described above.

Hereinafter, in the apparatus for displaying stereoscopic images in accordance with the exemplary embodiment of the present invention, the type of the main display part, the sub-display part, and the translucent reflective structure part, which can be implemented, will be described below. In this case, the configuration of the user tracking part and the stereoscopic image-generating part is the same as the above description, and therefore only the configuration of the main display part, the sub-display part, and the translucent reflective structure part will be described. FIGS. 4 to 7 are diagrams illustrating the exemplary embodiment of various types of apparatus for displaying stereoscopic images that can be configured to include the main display part, the sub-display part, and the translucent reflective structure part of the apparatus for displaying stereoscopic images in accordance with the exemplary embodiment of the present invention.

Figure 4:
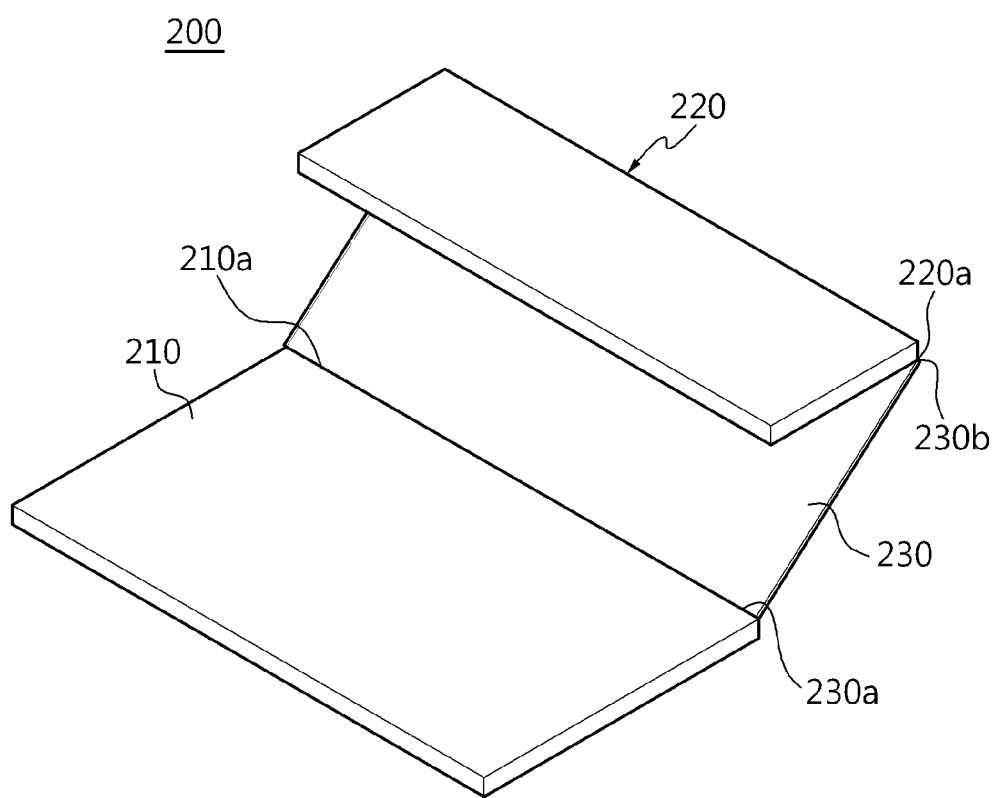
FIGS. 4 to 7 are diagrams illustrating the exemplary embodiment of various types of the apparatus for displaying stereoscopic images that can be configured to include the main display part, the sub-display part, and the translucent reflective structure part of the apparatus for displaying stereoscopic images in accordance with the exemplary embodiment of the present invention.

Referring to FIG. 4, in an apparatus 200 for displaying stereoscopic images in accordance with another exemplary embodiment of the present invention, the translucent reflective structure part 230 is configured to include a first side 230a and a second side 230b.

Further, the first side 230a of the translucent reflective structure part 230 is disposed to contact one side 210a of the main display part 210. In addition, the translucent reflective structure part 230 extends upwardly and obliquely from one side 210a of the main display part 210 to an outer side of the main display part 210. Further, the sub-display part 220 is formed over the translucent reflective structure part 230.

The sub-display part 220 may be formed to bring a second side 230b of the translucent reflective structure part 230 in contact with one side 220a of the sub-display part 220.

As such, the main display part 210 is not formed under the translucent reflective structure part 230, such that an interference phenomenon between the image of the main display part 210 and the image of the translucent reflective structure part 230 is reduced.

Figure 5:
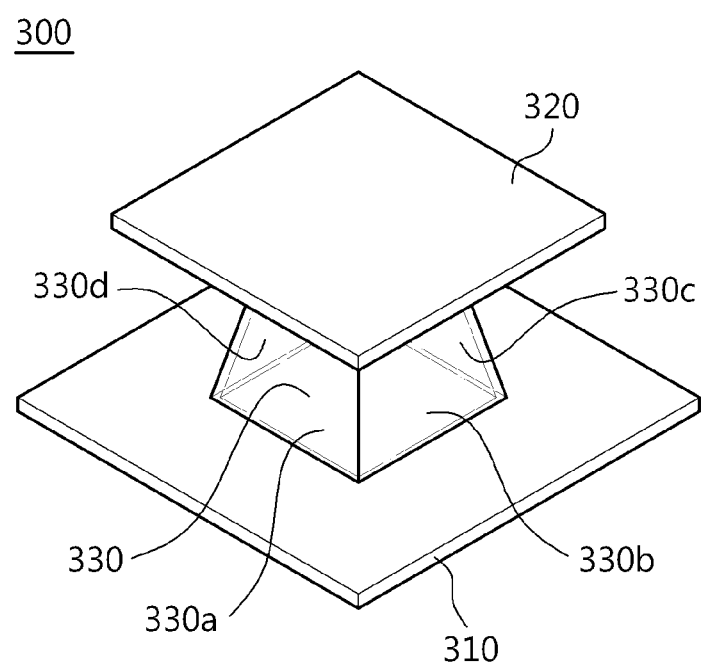

Referring to FIG. 5, in an apparatus 300 for displaying stereoscopic images in accordance with another exemplary embodiment of the present invention, a translucent reflective structure part 330 may be configured to include a first translucent reflective structure part 330a, a second translucent reflective structure part 330b, a third translucent reflective structure part 330c, and a fourth translucent reflective structure part 330d.

Further, the first translucent reflective structure part 330a, the second translucent reflective structure part 330b, the third translucent reflective structure part 330c, and the fourth translucent reflective structure part 330d are disposed in a rectangular pyramid in which a main display part 310 and a sub-display part 320 are each set as a bottom surface and a top surface.

As such, the stereoscopic image may be provided to the user by appropriately matching points of view at various positions for the apparatus 300 for displaying the stereoscopic image of the user.

Figure 6:
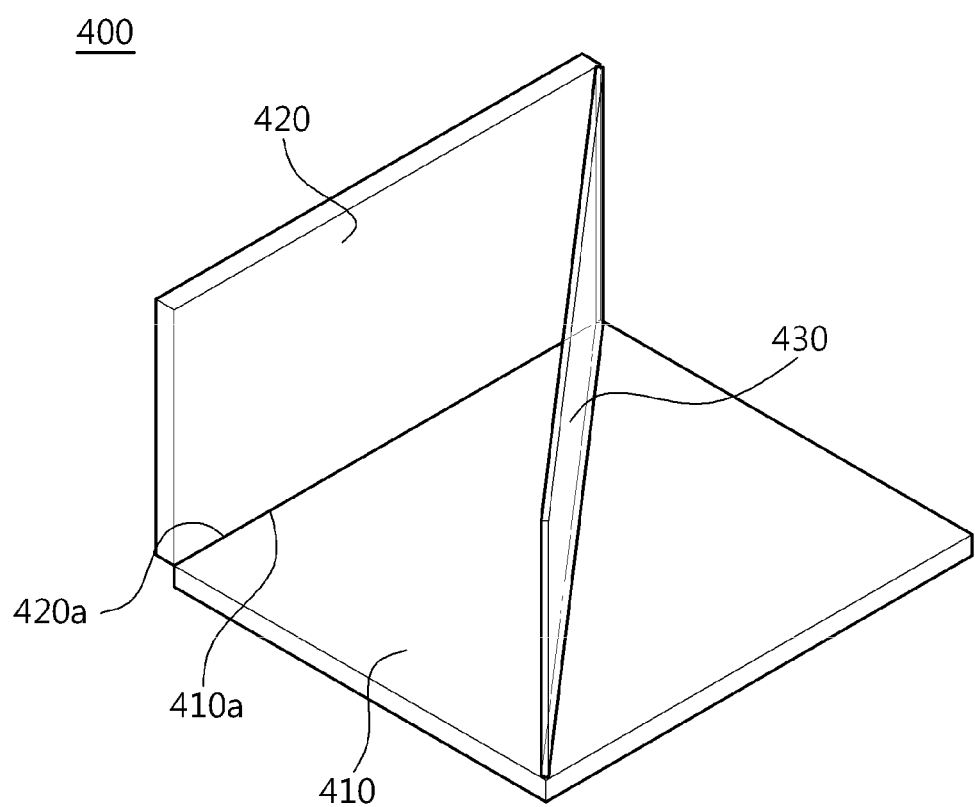

Referring to FIG. 6, in an apparatus 400 for displaying stereoscopic images in accordance with another exemplary embodiment of the present invention, a sub-display part 420 vertically extends upwardly from one side 410a of the main display part 410. Further, the translucent reflective structure part 430 vertically extends upwardly from one surface of the main display part 410.

In this case, the sub-display part 420 and the translucent reflective structure part 430 are formed to obliquely face each other. As such, the main display part 410 and the sub-display part 420 may be formed so as not to be parallel to each other in some cases.

Figure 7:
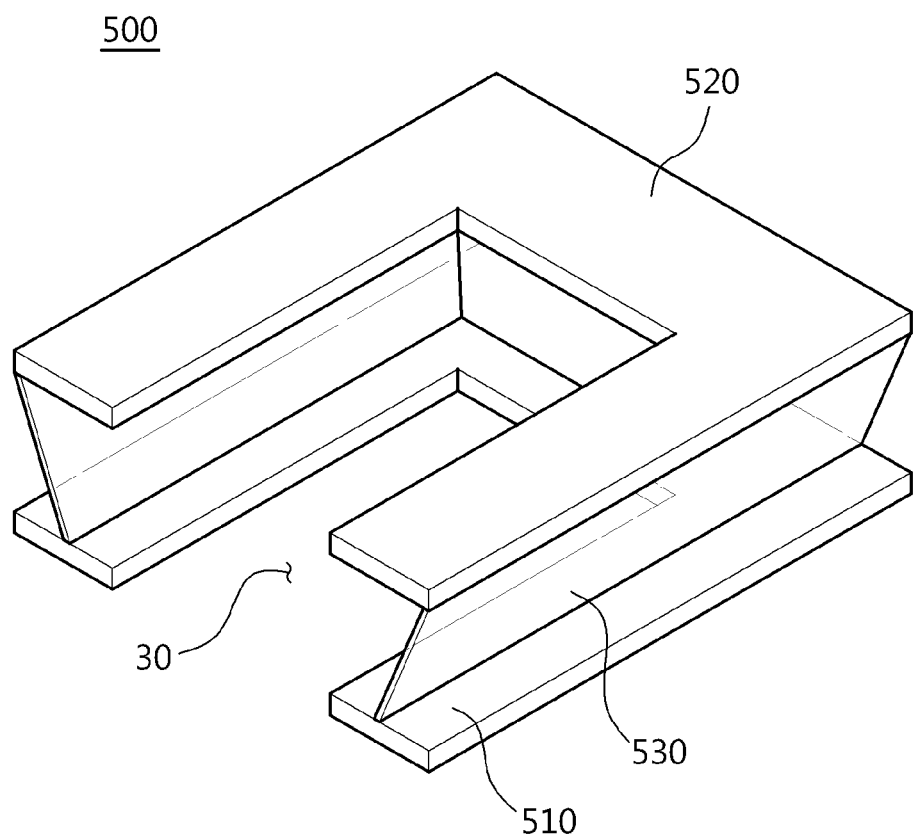

Referring to FIG. 7, in an apparatus 510 for displaying stereoscopic images in accordance with another exemplary embodiment of the present invention, a main display part 510 and a sub-display part 520 may be disposed parallel to each other while being spaced apart from each other.

Further, the translucent reflective structure part 530 is disposed between the main display part 510 and the sub-display part 520.

In addition, the main display part 510, the sub-display part 520, and the translucent reflective structure part 530 may be formed to surround the circumference of a user position part 30, at which a user watching a stereoscopic image through the main display part 510 and the translucent reflective structure part 530 is positioned. Therethrough, the user may watch a panoramic stereoscopic image at the user position part 30 using the apparatus 500 for displaying stereoscopic images.

Hereinafter, a method for displaying stereoscopic images in accordance with the exemplary embodiment of the present invention will be described.

Figure 8:
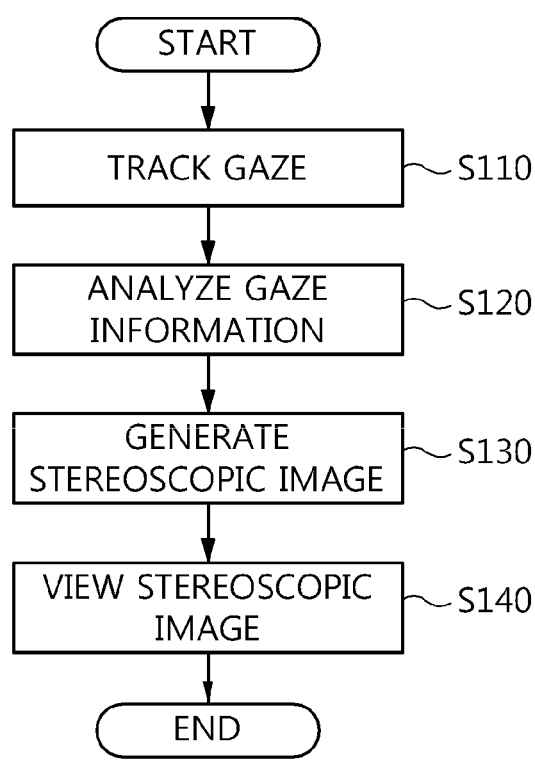
FIG. 8 is a flow chart for describing a method for displaying stereoscopic images in accordance with the exemplary embodiment of the present invention.

FIG. 8 is a flow chart for describing the method for displaying stereoscopic images in accordance with the exemplary embodiment of the present invention.

Figure 9:
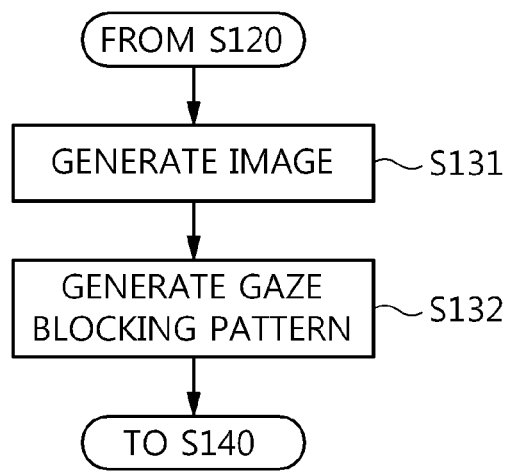
FIG. 9 is a flow chart for describing a process of generating stereoscopic images of the method for displaying stereoscopic images in accordance with the exemplary embodiment of the present invention.

FIG. 9 is a flow chart for describing the process of generating stereoscopic images of the method for displaying stereoscopic images in accordance with the exemplary embodiment of the present invention.

Referring to FIG. 8, the method for displaying stereoscopic images in accordance with the exemplary embodiment of the present invention may be configured to include generating the stereoscopic images at step S130 and viewing the stereoscopic images at step S140.

In addition, the method for displaying stereoscopic images in accordance with the exemplary embodiment of the present invention may be configured to further include tracking a gaze at step S110 and analyzing information at step S120.

The tracking of the gaze at step S110 is acquiring the gaze information of the user. That is, the tracking of the gaze at step S110 acquires information such as the position of the left and right eyes of the user who watches the stereoscopic images.

The analyzing of the gaze information at step S120 is analyzing the gaze information acquired at the tracking of the gaze at step S110.

The generating of the stereoscopic image at step S130 is splitting and generating a single image into the first stereoscopic image, which is directly viewed by the user, and the second stereoscopic image, which is reflected and then viewed by the user.

Referring to FIG. 9, the generating of the stereoscopic image at step S130 may be configured to include generating the images at step S131 and generating the gaze-blocking pattern at step S132.

The generating of the image at step S131 splits and generates the single image into the two-dimensional first image and second image based on the gaze information of the user analyzed at the analyzing of the gaze information at step S120.

The generating of the gaze-blocking pattern at step S132 generates the first gaze-blocking pattern and the second gaze-blocking pattern so as to recognize the first image and the second image as the three-dimensional first stereoscopic image and second stereoscopic image, based on the gaze information of the user analyzed at the analyzing of the gaze information at step S120.

The viewing of the stereoscopic image at step S140 is directly displaying the first stereoscopic image to the gaze of the user. Further, the viewing of the stereoscopic image at step S140 is reflecting and displaying the second stereoscopic image to the gaze of the user through the translucent reflective structure. In this case, the user recognizes a stereoscopic image in which the first stereoscopic image and the second stereoscopic image are mutually fused.

As described above, the configuration and the method of the exemplary embodiments as described above do not apply only to the apparatus and the method for displaying stereoscopic images, but all or a part of each exemplary embodiment of the present invention may be selectively combined with each other so that the exemplary embodiments of the present invention can be variously modified.

Figure 10:
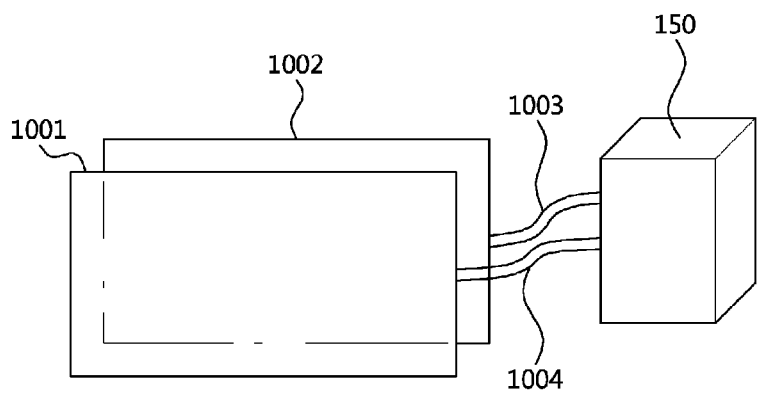
FIG. 10 is a configuration diagram of each stereoscopic image display disposed over and under the translucent reflective structure part.

FIG. 10 is a configuration diagram of each stereoscopic image display disposed above and below the translucent reflective structure part.

The stereoscopic image, generated to match the gaze of each user, needs to be presented on the display part so as to meet the position of each user. To this end, in the exemplary embodiment of the present invention, the stereoscopic image display having the structure shown in FIG. 10 is used for the main display part and the sub-stereoscopic display part, respectively. The stereoscopic image display is mounted with a gaze-splitting device part 1001 prior to a two-dimensional image presentation part 1002 so as to provide the auto-stereoscopic image. The gaze-splitting device part 1001 generates the gaze-blocking pattern so that the image region on the two-dimensional image presentation part 1002, appearing at the position of the gaze of the user and the positions of the left and right eyes of the user, is split according to the gaze position.

In this case, the presented gaze-blocking pattern is changed in some cases, which is determined by the stereoscopic image-generating part 150 based on the gaze position information of the user and is transferred through a gaze-splitting device part control signal 1004. Due to this configuration, the stereoscopic image generated from the stereoscopic image-generating part 150 is presented to the two-dimensional image presentation part 1002 through an image control signal 1003 and is transferred to match the left and right eyes of the user by the gaze-splitting device part 1001, thereby obtaining the effect of a stereoscopic image.

Figure 11:
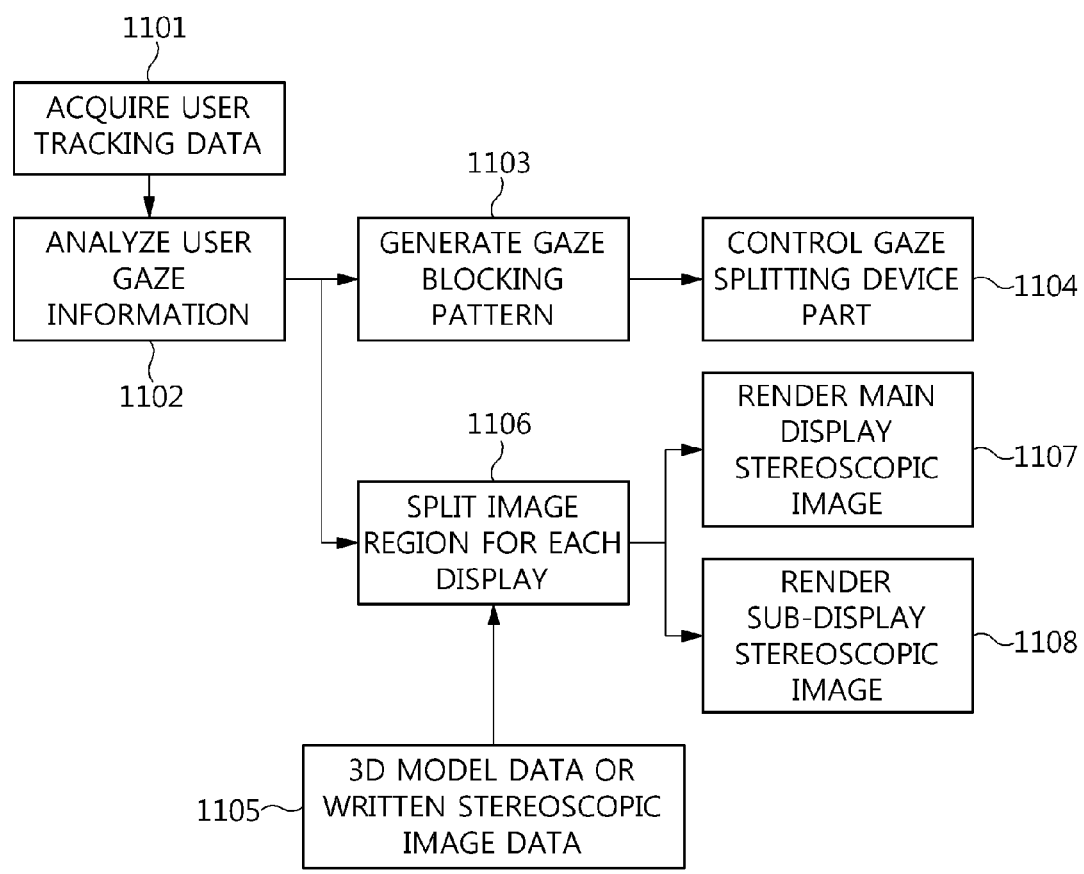
FIG. 11 is a block diagram illustrating the operation of the stereoscopic image-generating part for generating the fused stereoscopic images.

FIG. 11 is a block diagram illustrating the operation of the stereoscopic image-generating part 150 for generating the fused stereoscopic images.

A user tracking data acquisition module 1101 acquires user acquisition data from the user tracking part 140, and a user gaze information analysis module 1102 analyzes the gaze information of the left and right eyes for each user based on the acquired user tracking data.

A gaze-blocking pattern-generating module 1103 generates the gaze-blocking pattern so as to transfer the images corresponding to the gazes of the left and right eyes for each user from the gaze-splitting device part 112 based on the calculated gaze information of each user and a gaze-splitting device part control module 1104 controls the gaze-splitting device part 112 based on the generated pattern to split the gaze region for the image shown in the two-dimensional image presentation part 1002, which presents the stereoscopic images matching the gaze of each user. In this case, an image region-splitting module 1106 for each display for generating the images presented to the two-dimensional image presentation part 1002 splits 3D model data to be presented as the stereoscopic image or written stereoscopic image data 1105 into parts that are charged by the main display part 111 and the sub-display part 112 based on the gaze information of the user gaze information analysis module 1102, and splits the data into a main display stereoscopic image rendering module 1107 and a sub-display stereoscopic image rendering module

1108 to generate the images to be presented to the two-dimensional image presentation part 1002 of the stereoscopic image displays.

Under face-to-face conference situations in which a plurality of users participate, as in the conceptual illustration at the right of FIG. 12, the structure of the stereoscopic image display technology that can display information of interest in a central space and can be observed from all directions will be described.

The display is configured of stereoscopic image output modules 1200 and 1201, and displays image information to a user in a direction 1240 and to a user in direction 1243 using a translucent reflective module 1210 disposed therebetween.

As the stereoscopic display modules 1200 and 1201, a module driven based on various output schemes, such as a stereoscopic scheme and an auto-stereoscopic scheme, may be applied. Further, in order to support the more accurate generation of the stereoscopic image and the interaction with contents, the stereoscopic display modules 1200 and 1201 may use programs to acquire information regarding the point of view and the motion of the body of the user using user information-tracking parts 1220 and 1221. When virtual 3D content 1230 viewed through the image output system is viewed as a single object in a specific space, reference numeral 1200 generates (for example, a 180° region of a front part of an object) an image that may be seen at user positions of 1240 to 1240, or the like, and 1201 generates (for example: a 180° region of a rear part of an object) an image that can be seen at user positions of 1244 to 1245, or the like.

As the occasion demands, information that shares the information indicated by the reference numeral 1230 or different information is outputted to a space that can be represented by the apparatuses 1200 and 1201. The effect is generated from the characteristics of the optical disposition structure of 1200, 1201, and 1230 and can allow only each user to observe the virtual image in the three-dimensional space, such that the viewed contents and the point of view control information are implemented using a software control method.

Figure 12:
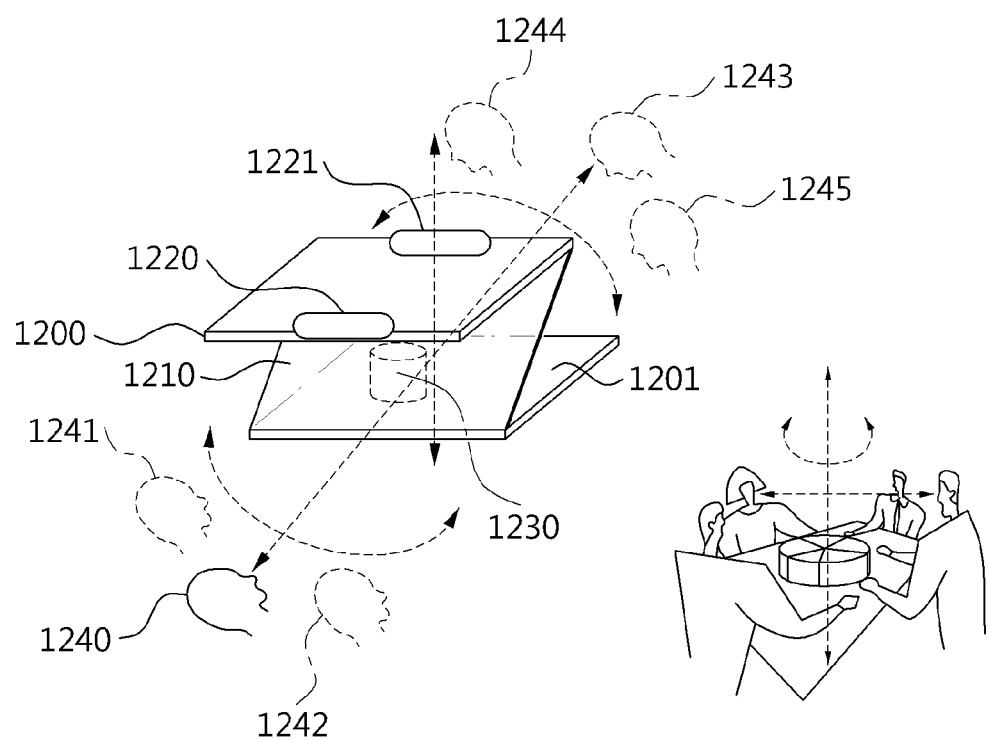
FIG. 12 is a diagram illustrating the exemplary embodiment of various types of stereoscopic image display tables configurable by using the translucent reflective structure part having a polyhedral shape.
Figure 13:
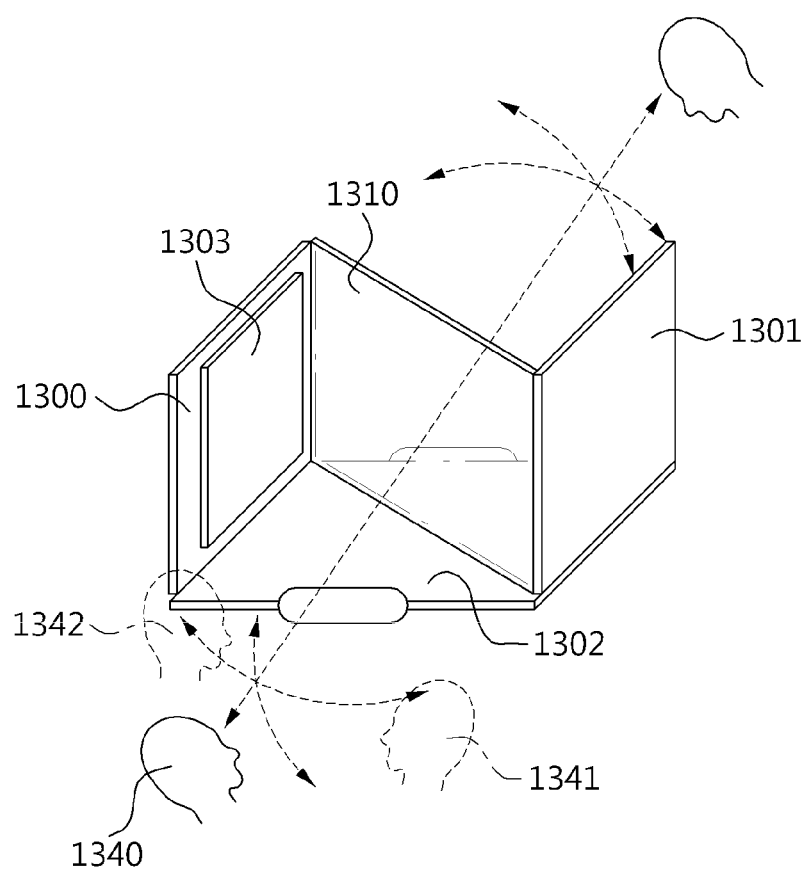
FIG. 13 is a structural diagram for describing a function of allowing a plurality of users to observe the stereoscopic images while progressing a gaze cross type cooperation conference in a 360° direction around the display.

FIG. 13 is a diagram for describing a type in which the advantage of the structure proposed in FIG. 12 is combined with the advantage of the structure proposed in FIG. 1, in which the stereoscopic image contents in the space adjacent to the table and the space on the table can be viewed, and at the same time, a plurality of users can participate in the gaze cross type cooperation situations. In order to prevent the information viewed by a stereoscopic image output module 1300 from being directly observed by the eye of a user 1340, the stereoscopic output module 1300 has a filter part 1303 attached thereto. In accordance with the exemplary embodiment of the present invention, the filter part 1303 may include a polarizing filter.

The user can observe various stereoscopic images for a horizontal moving direction, like directions 1340 and 1341 by the display structure proposed in FIG. 13, and can also observe various stereoscopic images for a vertical moving direction, like the directions 1340 and 1342.

Figure 14:
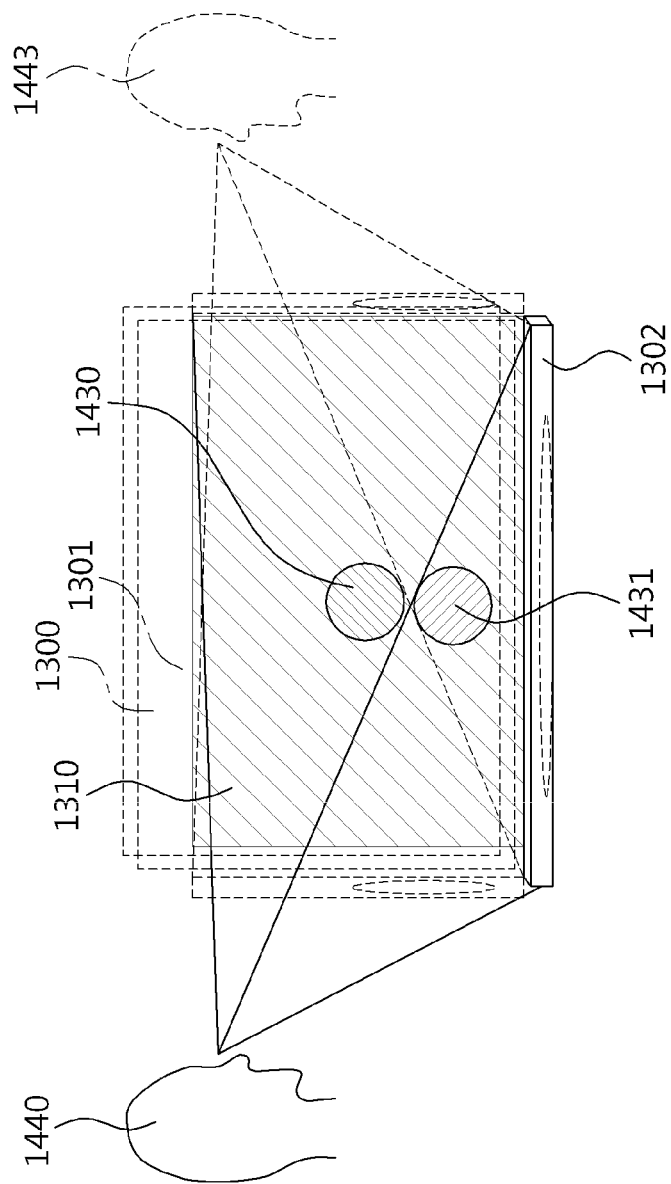
FIG. 14 is a diagram for describing a type of fusing the advantage of the structure proposed in FIG. 13 with the advantage of the structure proposed in FIG. 1.

FIG. 14 describes a method for sharing stereoscopic images and viewing individual information of FIG. 13.

Like the basic idea of FIG. 1, the stereoscopic image adjacent to the surface of the table and the stereoscopic image for a region deviating from the viewing frustum defined by the surface of the table and the point of view of the user 1440 can be viewed by the display disposition of the horizontal and vertical structures.

The stereoscopic content viewed by independent modules 1300 and 1301 can represent the information on a specific object in the same three-dimensional space 1430 by controlling the depth perception based on a stereo image algorithm using a binocular image and the same or different information can be viewed at the same position or at a different position in a stereoscopic image output space using independent presence characteristics of the display module. In the case of adjacent steel box objects on the table, various schemes (for example: a method for outputting a time-division image based on active stereo, a spatial splitting method for splitting multi-view point regions of an auto-stereoscopic display, or a method for displaying only respective information by attaching a mask having a specific shape) may be applied.

Reference numeral 1430 is the same/separate 3D information, by which a user 1440 feels the same/separate 3D spatial position perception, which may be generated by each of the main stereoscopic display modules 1300 and 1301.

Reference numeral 1431 is the same/separate 3D information by which the user 1440 feels the same/separate spatial position perception, which is represented by separating and using a multi-view output function of the sub-display module 1302.

Figure 15:
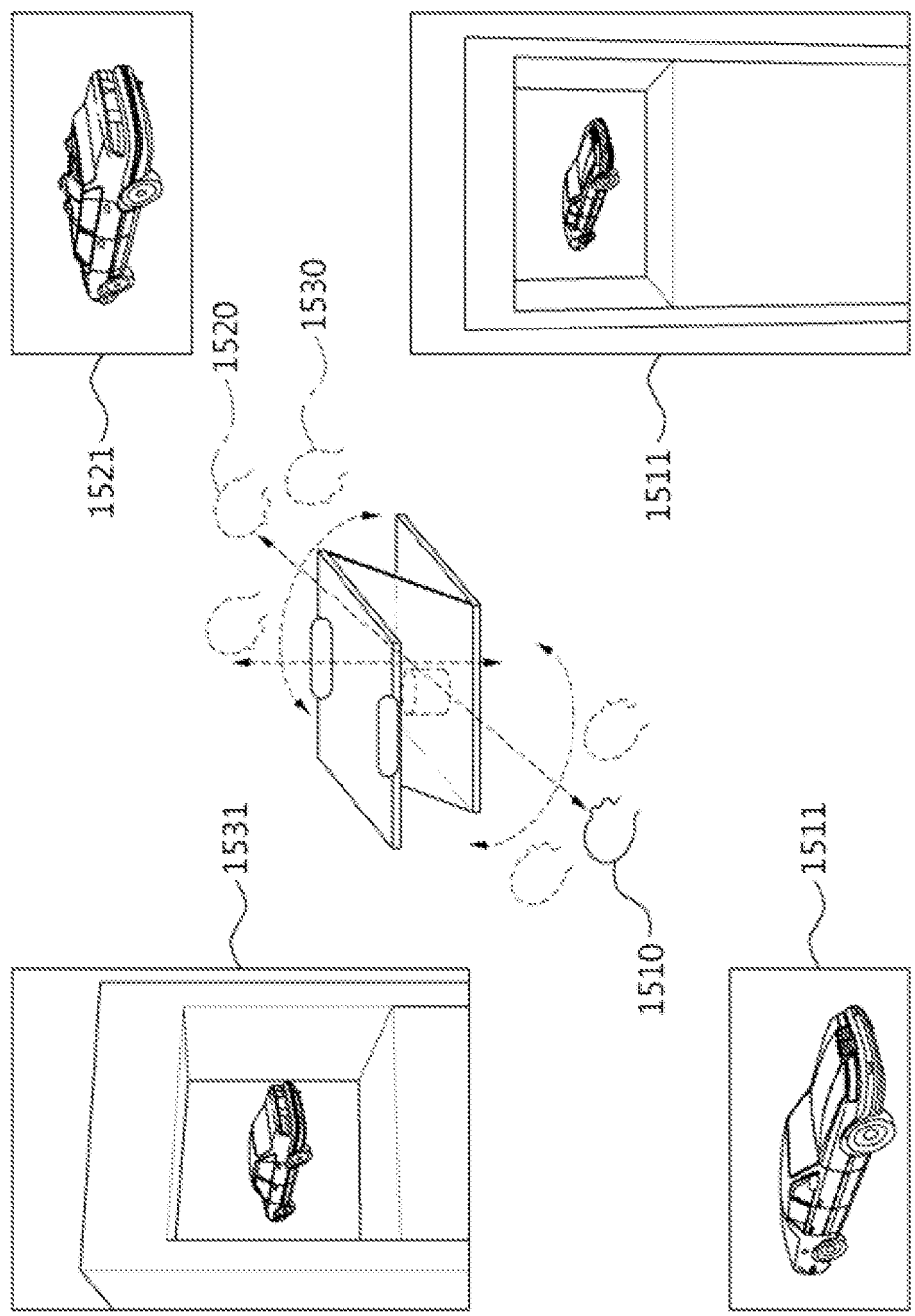
FIG. 15 is a diagram illustrating the exemplary embodiment capable of observing contents in all directions around a display under the situation in which a single car model is viewed in a space like a volumetric display.

FIG. 15 is a diagram illustrating an exemplary embodiment capable of observing contents from all directions around a display in the situation in which a single car model is viewed in a space like a volumetric display.

FIG. 15 illustrates an example in which a part of an idea proposed by the exemplary embodiment of the present invention is actually implemented, wherein the example shows a situation in which a single car model is viewed in a space like a volumetric display and the contents can be observed from all directions around the display. Further, respective users view different information (car appearance design information and inside design information) from the same position, and at the same time, can confer with other viewers while observing their faces.

For example, the user positioned at reference numeral 1510 can confirm the design of the front appearance of a car model that is represented by the stereoscopic image like reference numeral 1511.

In addition, users positioned opposite to the user positioned at reference numeral 1510 can check the design of the rear appearance of a car model. In this case, different information of a car may be viewed according to the position of a user.

For example, the user positioned at reference numeral 1530 can check the design of the rear appearance of the car model, like reference numeral 1531, and the user positioned at reference numeral 1520 can check the design of the rear interior of the car model, like reference numeral 1521.

That is, the user positioned at reference numeral 1510, the user positioned at reference numeral 1520, and the user positioned at reference numeral 1530 can confer with each other while checking the car model viewed as the stereoscopic image.

The method for displaying stereoscopic images according to the exemplary embodiment of the present invention may be implemented as a program instruction type that may be performed through various computer units and may be recorded in a computer-readable medium. The computer readable medium may include program instructions, data files, data structures, and the like, alone or in combinations thereof. The program instructions recorded in the medium may be ones particularly designed and configured to support the present invention, computer software, or usable ones known to those skilled in the art. An example of the computer-readable recording medium may include magnetic media such as a hard disk, a floppy disk, and a magnetic tape, optical media such as CD-ROM, DVD, magento-optical media such as a floptical disk, a hardware apparatus particularly configured to store and perform program instructions such as ROM, RAM, flash memory, or the like. An example of the program instruction may include machine language code such as that output by a compiler and advanced language code that may be executed by a computer using an interpreter, or the like. The hardware apparatus may be configured to be operated as at least one software module so as to perform the operation of the present invention and vice versa.

The exemplary embodiments of the present invention can provide stereoscopic images having a more realistic three-dimensional effect and the spatial perception to users by providing the stereoscopic images to the main display part and even to the top of the table using the translucent reflective structure part.

In addition, the exemplary embodiment of the present invention can provide accurate stereoscopic images matching users' gazes to users by tracking and analyzing the users' gazes.

Further, in accordance with the exemplary embodiment thereof, the present invention can generate the stereoscopic images in the stereoscopic space on the table by adding the sub-stereoscopic display along with the translucent reflective structure part to the main stereoscopic display disposed on the top plate of the table.

Moreover, the exemplary embodiment of the present invention can generate accurate stereoscopic images matching each gaze of each of the multiple users by tracking the gaze positions of each of the plurality of users by allowing each of the plurality of users to use the tracking device parts.

Also, the exemplary embodiments of the present invention can generate the fused type of stereoscopic images by using the gaze information of each of the plurality of users obtained by allowing each of the plurality of users to use the tracking device parts so as to divide the responsible stereoscopic image region of the main display part and the sub-display part.

The exemplary embodiments of the present invention can generate the gaze-blocking pattern by reflecting the gaze information of each of the plurality of users, obtained by allowing each of the plurality of users to use the tracking device parts, and then using the generated gaze-blocking pattern to control the gaze split device part of the auto-stereoscopic display, thereby providing the accurate stereoscopic image matching the gazes of each of the plurality of users.

In the exemplary embodiments of the present invention the stereoscopic image display table having the structure for supporting a wide point of view can configure by configuring the translucent reflective structure part basically having a plane shape in a polyhedral shape such as a polygonal pyramid, or the like by connecting the translucent reflective structure part.

The exemplary embodiments of the present invention can output and view the stereoscopic images reflected in all directions to observe one object from 360° in the same three-dimensional space using both surfaces of the translucent reflective structure part.

The exemplary embodiments of the present invention can provide a virtual hologram apparatus supporting the gaze cross type cooperation by suitable arrangement of the plurality of stereoscopic image output modules and the translucent reflective structure part.

While the present invention has been described with respect to the specific embodiments, it will be apparent to those skilled in the art that various changes and modifications may be made without departing from the spirit and scope of the invention as defined in the following claims.

What is claimed is:

1. An apparatus for displaying stereoscopic images, comprising:
   a stereoscopic image-generating part configured to split an input image into a first image and a second image;
   a main display part coupled to the stereoscopic image-generating part and configured to receive a first signal corresponding to the first image and generate a first stereoscopic image based on the first signal, the main display part directly displaying the first stereoscopic image to a gaze of a user;
   a sub-display part coupled to the stereoscopic image-generating part and configured to receive a second signal corresponding to the second image and generate a second stereoscopic image based on the second signal; and
   a translucent reflective structure part configured to reflect the second stereoscopic image, displayed on the sub-display part, to the gaze of the user to form a three-dimensional image including the first stereoscopic image and the reflected second stereoscopic image displayed to the user.

2. The apparatus of claim 1, further comprising:
   a user tracking part configured to track the gaze of the user and generate gaze information of the user, wherein the stereoscopic image-generating part splits the input image based on the gaze information.

3. The apparatus of claim 2, wherein the first signal includes a first image control signal and a first gaze-splitting device part control signal,
   wherein the main display part comprises:
      a first image output part configured to receive the first image control signal to display the first stereoscopic image; and
      a first gaze-splitting device part configured to receive the first gaze-splitting device part control signal and form a first gaze-blocking pattern on one surface of the first image output part to generate the first stereoscopic image,
   wherein the second signal includes a second image control signal and a second gaze-splitting device part control signal, and
   wherein the sub-display part comprises:
      a second image output part configured to receive the second image control signal to display the second stereoscopic image; and
      a second gaze-splitting device part configured to receive the second gaze-splitting device part control signal and form a second gaze-blocking pattern on one surface of the second image output part to generate the second stereoscopic image.

4. The apparatus of claim 3, wherein the stereoscopic image-generating part further comprises:
   a storage part that stores the input image;
   a gaze information analysis part configured to analyze the gaze information of the user;
   an image-splitting part configured to split the input image into the first image and the second image based on the gaze information analyzed by the gaze information analysis part; and
   a gaze-blocking pattern-generating part configured to generate the first and second gaze-splitting device part control signals to form the first gaze-blocking pattern and the second gaze-blocking pattern in the first gaze-splitting device part and the second gaze-splitting device part, respectively, based on the gaze information analyzed by the gaze information analysis part.

5. The apparatus of claim 1, wherein the translucent reflective structure part has a first side and a second side opposite to the first side,
- wherein the sub-display part extends over the main display part and is substantially parallel to the main display part,
- wherein the first side of the translucent reflective structure part contacts one side of an end of the main display part, the translucent reflective structure part upwardly extending obliquely from the one side of the end of the main display part to form an obtuse angle with the main display part, and
- wherein the second side of the translucent reflective structure part contacts one side of an end of the sub-display part to form an acute angle with the sub-display part.

6. The apparatus of claim 1, wherein the translucent reflective structure part comprises a first translucent reflective structure part, a second translucent reflective structure part, a third translucent reflective structure part, and a fourth translucent reflective structure part, and
- wherein the first translucent reflective structure part, the second translucent reflective structure part, the third translucent reflective structure part, and the fourth translucent reflective structure part are disposed between the main display part and the sub-display part and form a rectangular truncated pyramid shape in which the main display part and the sub-display part are a bottom surface and a top surface, respectively.

7. The apparatus of claim 1, wherein the sub-display part has a first side contacting one side of the main display part and is perpendicular to a top surface of the main display part, and
- wherein the translucent reflective structure part is perpendicular to the top surface of the main display part and has one side contacting a second side of the sub-display part to form an acute angle with the sub-display part, the first side and the second side of the sub-display part being perpendicular to each other.

8. The apparatus of claim 1, wherein the sub-display part is disposed parallel to and over the main display part and the translucent reflective structure part is disposed between the main display part and the sub-display part, and
- wherein the main display part, the sub-display part, and the translucent reflective structure part are disposed along a circumference of a user position part at which the user watches the stereoscopic images provided by the main display part and the translucent reflective structure part, the translucent reflective structure part having three parts disposed along three sides of the user position part.

9. A method performed by a computer system for displaying stereoscopic images, comprising:
- splitting an input image into a first image and a second image;
- generating a first stereoscopic image that is directly displayed based on the first image and a second stereoscopic image that is reflected and displayed based on the second image, respectively; and
- directly displaying the first stereoscopic image to a gaze of a user and displaying the reflected second stereoscopic image to the gaze of the user through a translucent reflective structure,
- wherein a main display part receives a first signal corresponding to the first image and generates the first stereoscopic image based on the first signal and a sub-display part receives a second signal corresponding to the second image and generates the second stereoscopic image based on the second signal.

10. The method of claim 9, further comprising:
- tracking gaze information of the user; and
- analyzing the gaze information of the user,
- wherein splitting the input image and generating the first stereoscopic image and second stereoscopic image are performed based on the analyzed gaze information.

11. The method of claim 10, wherein the first signal includes a first image control signal and a first gaze-splitting device part control signal, and
- wherein generating the first stereoscopic image and the second stereoscopic image comprises generating a first gaze-blocking pattern for the first image and a second gaze-blocking pattern for the second image to display the first image and the second image as the first stereoscopic image and the second stereoscopic image, based on the gaze information of the user.

12. An apparatus for displaying stereoscopic images, comprising:
- a stereoscopic image-generating part configured to split at least one input image into at least one first image and at least one second image to generate at least one first stereoscopic image using information on different points of view of each of the plurality of users and at least one second stereoscopic image corresponding to the at least one first stereoscopic image, using information regarding different points of view and motions of bodies of the plurality of users;
- a main display part coupled to the stereoscopic image-generating part and configured to receive a first signal corresponding to the at least one first image and generate the at least one first stereoscopic image based on the first signal, the main display part directly displaying the at least one first stereoscopic image to gazes of each of the plurality of users using the information regarding the different points of view and the motions of bodies of each of the plurality of users;
- a sub-display part coupled to the stereoscopic image-generating part and configured to receive a second signal corresponding to the at least one second image and generate the at least one second stereoscopic image based on the second signal; and
- a translucent reflective structure part configured to reflect the at least one second stereoscopic image, displayed on the sub-display part, to the gazes of each of the plurality of users,
- wherein a three-dimensional image formed in a space by the at least one first stereoscopic image and second stereoscopic image is displayed as the same shape at the different points of view, and
- wherein the stereoscopic image-generating part comprises a user tracking part that tracks gaze information of each of the plurality of users.

13. The apparatus of claim 12, wherein the first signal includes a first image control signal and a first gaze-splitting device part control signal,
- wherein the main display part comprises:
  - a first image output part configured to receive the first image control signal to display the at least one first stereoscopic image; and
  - a first gaze-splitting device part configured to receive the first gaze-splitting device part control signal and form a first gaze-blocking pattern on one surface of the first image output part to generate the at least one first stereoscopic image,
- wherein the second signal includes a second image control signal and a second gaze-splitting device part control signal, and wherein the sub-display part comprises:
- a second image output part configured to receive the second image control signal to display the at least one second stereoscopic image; and
- a second gaze-splitting device part configured to receive the second gaze-splitting device part control signal and form a second gaze-blocking pattern on one surface of the second image output part to generate the at least one second stereoscopic image.

14. The apparatus of claim 13, wherein the stereoscopic image-generating part further comprises:
- a storage part that stores the at least one input image;
- a gaze information analysis part configured to analyze the gaze information of each of the plurality of users;
- an image-splitting part configured to split the at least one input image into the at least one first image and the at least one second image, based on the gaze information analyzed by the gaze information analysis part; and
- a gaze-blocking pattern-generating part configured to generate the first and second gaze-splitting device part control signals to form the first gaze-blocking pattern and the second gaze-blocking pattern in the first gaze-splitting device part and the second gaze-splitting device part, respectively, based on the gaze information analyzed by the gaze information analysis part.

15. The apparatus of claim 12, wherein the translucent reflective structure part has a first side and a second side opposite to the first side,
- wherein the sub-display part extends over the main display part and is substantially parallel to the main display part,
- wherein the first side of the translucent reflective structure part contacts one side of an end of the main display part, the translucent reflective structure part upwardly extending obliquely from the one side of the end of the main display part to form an obtuse angle with the main display part, and
- wherein the second side of the translucent reflective structure part contacts one side of an end of the sub-display part to form an acute angle with the sub-display part.

16. The apparatus of claim 12, wherein the translucent reflective structure part comprises a first translucent reflective structure part, a second translucent reflective structure part, a third translucent reflective structure part, and a fourth translucent reflective structure part, and
- wherein the first translucent reflective structure part, the second translucent reflective structure part, the third translucent reflective structure part, and the fourth translucent reflective structure part are disposed between the main display part and the sub-display part and form a rectangular truncated pyramid shape, in which the main display part and the sub-display part are a bottom surface and a top surface, respectively.

17. The apparatus of claim 12, wherein the sub-display part has a first side contacting one side of the main display part and is perpendicular to a top surface of the main display part, and
- wherein the translucent reflective structure part is perpendicular to the top surface of the main display part and has one side contacting a second side of the sub-display part to form an acute angle with the sub-display part, the first side and the second side of the sub-display part being perpendicular to each other.

18. The apparatus of claim 12, wherein the sub-display part is disposed parallel to and over the main display part and the translucent reflective structure part is disposed between the main display part and the sub-display part, and
- wherein the main display part, the sub-display part, and the translucent reflective structure part are disposed along a circumference of position parts of each of the plurality of users at which each of the plurality of users watches the stereoscopic images provided by the main display part and the translucent reflective structure part, the translucent reflective structure part having three parts disposed along three sides of the position parts.

19. A method performed by a computer system for displaying stereoscopic images, comprising:
- splitting at least one input image into at least one first image and at least one second image;
- generating at least one first stereoscopic image based on the at least one first image using information on different points of view of each of a plurality of users and generating at least one second stereoscopic image corresponding to the at least one first stereoscopic image based on the at least one second image using the information on different points of view and information on motions of bodies of the plurality of users by a stereoscopic image-generating part;
- directly displaying the at least one first stereoscopic image to gazes of each of the plurality of users using the information regarding the different points of view and the motions of bodies of each of the plurality of users by a main display part;
- displaying the at least one second stereoscopic image by a sub-display part;
- reflecting the at least one second stereoscopic image displayed on the sub-display part to the gazes of each of the plurality of users by a translucent reflective structure part; and
- tracking gaze information of the user,
- wherein the main display part receives a first signal corresponding to the at least one first image and generates the at least one first stereoscopic image based on the first signal and the sub-display part receives a second signal corresponding to the at least one second image and generates the at least one second stereoscopic image based on the second signal, and
- wherein the stereoscopic image formed in a space by the at least one first stereoscopic image and the at least one second stereoscopic image is displayed as the same shape at the different points of view, and
- wherein tracking of the gaze information comprises:
  - tracking the gaze information of each of the plurality of users; and
  - analyzing the gaze information of each of the plurality of users.

20. The method of claim 19, wherein generating the at least one first stereoscopic image and the at least one second stereoscopic image by the stereoscopic image-generating part comprises:
- generating a first gaze-blocking pattern for the first image and a second gaze-blocking pattern for the second image to display the at least one first image and the at least one second image as the at least one first stereoscopic image and the at least one second stereoscopic image, respectively, based on the gaze information of each of the plurality of users.

* * * * *